United States Patent [19]

Pekar

[11] Patent Number: 5,144,708
[45] Date of Patent: Sep. 8, 1992

[54] CHECK VALVE FOR FLUID BLADDERS

[75] Inventor: Robert W. Pekar, Florence, Mass.

[73] Assignee: Dielectrics Industries, Chicopee, Mass.

[21] Appl. No.: 783,398

[22] Filed: Oct. 28, 1991

Related U.S. Application Data

[63] Continuation-in-part of Ser. No. 660,549, Feb. 26, 1991, abandoned, and a continuation-in-part of Ser. No. 767,425, Sep. 30, 1991, abandoned.

[51] Int. Cl.$^5$ ............................................. F16K 15/16
[52] U.S. Cl. ...................................... 5/454; 137/223; 137/846; 417/480
[58] Field of Search ..................... 5/454, 455; 137/846, 137/223; 417/479, 480

[56] References Cited

U.S. PATENT DOCUMENTS

| | | | |
|---|---|---|---|
| 3,068,494 | 12/1962 | Pinkwater | 5/454 |
| 3,133,696 | 5/1964 | Mirando | 417/479 |
| 4,708,167 | 11/1987 | Koyanagi | 137/846 X |
| 4,917,646 | 4/1990 | Kieves | 137/846 X |
| 4,930,174 | 6/1990 | Hunter | 417/479 X |
| 4,966,197 | 10/1990 | Jaron | 137/846 |

Primary Examiner—Robert G. Nilson
Attorney, Agent, or Firm—Chapin, Neal & Dempsey

[57] ABSTRACT

A check valve provides a one-way fluid passage from without to within a fluid bladder formed by a pair of plastic sheets sealed together about their periphery. The check valve is formed by a pair of superimposed films of thermoplastic material, generally equal in length, thermally bonded together at predetermined areas to define the fluid passage throughout the length of the valve. Each of the films, adjacent one end thereof, is sealed to one of the outer sheets where the valve enters the bladder by a seal line of wedge shape. Each of the films has a high-gloss, cohesive inner surface and a matte, non-cohesive, outer surface. At least one of the films includes, on its inner surface, a release material disposed at a location which corresponds to the area at the inlet end of the fluid passage through the peripheral seal of the bladder to prevent the fusing together of the films at that area of the seal. The seal in that area has a V-shape with apex pointing in a direction opposite the one-way fluid flow. The terminal ends of the superimposed films extend in surface-to-surface relation into the bladder to provide a "duck-bill" type check valve.

8 Claims, 2 Drawing Sheets

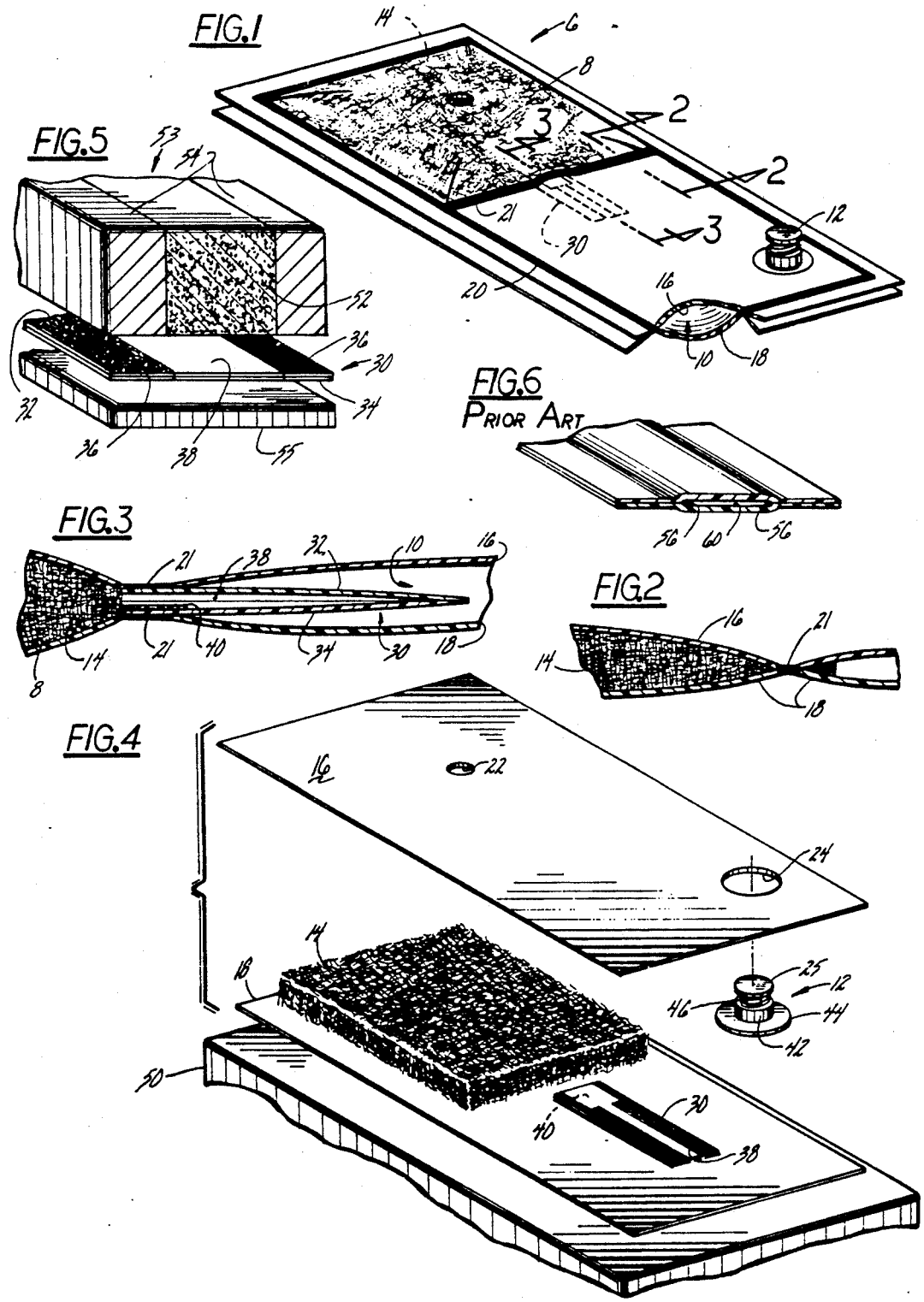

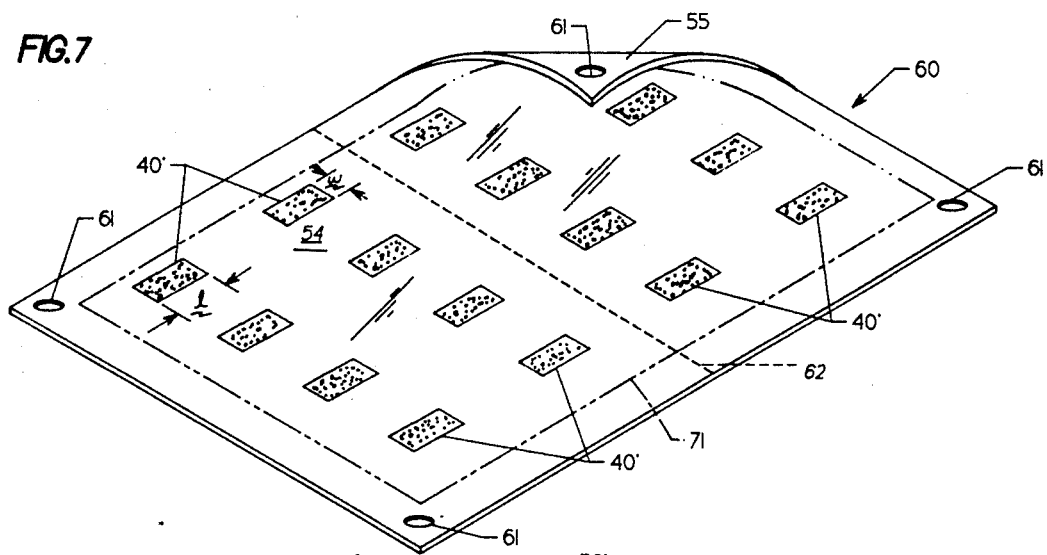
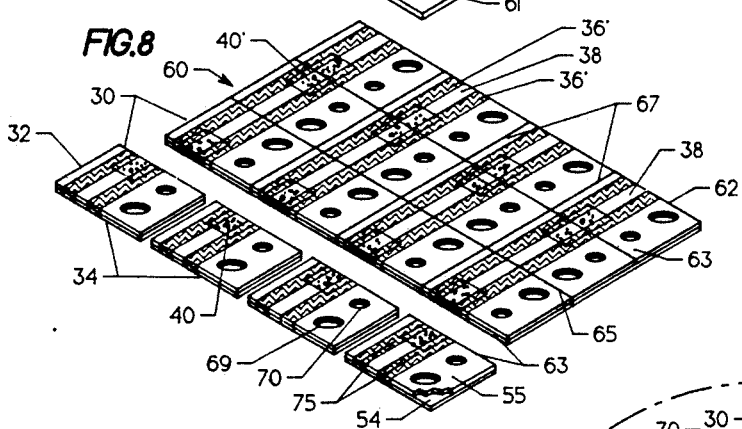
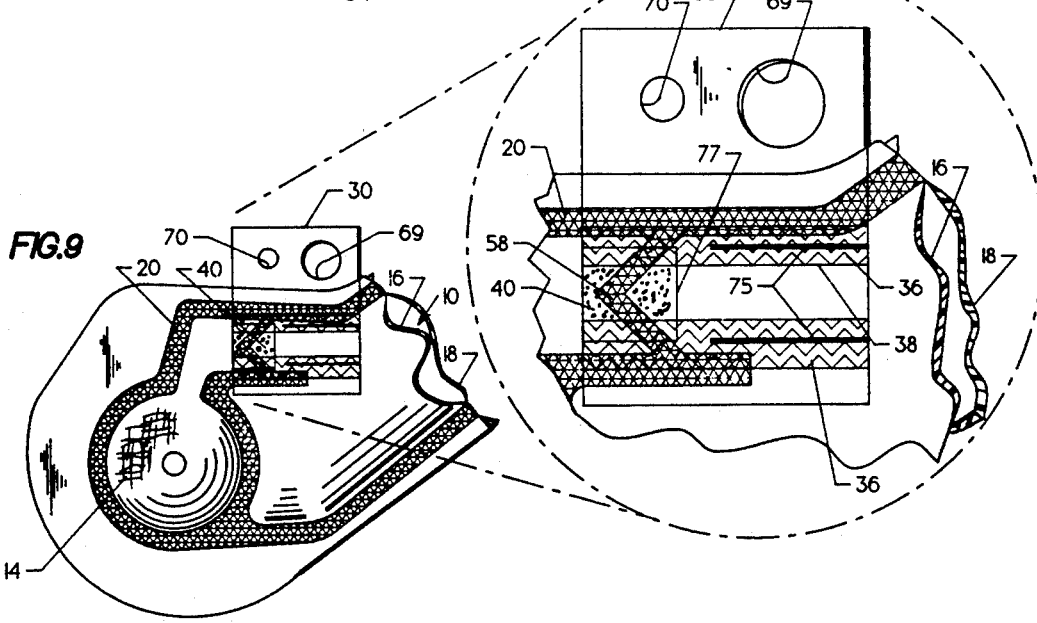

CHECK VALVE FOR FLUID BLADDERS

This application is a continuation-in-part of my copending application for "CHECK VALVE FOR AIR BLADDERS", Ser. No. 07/660,549, Filed Feb. 26, 1991, now abandoned and of Ser. No. 07/767,425, Filed Sep. 30, 1991, now abandoned.

BACKGROUND OF THE INVENTION

This invention relates to check valves associated with fluid chambers or inflatable bladders and, more particularly, such valves as are formed of thermoplastic film material and which are adapted to be used in combination with a fluid pump or other bladder inflation device.

U.S. Pat. No. 3,133,696 to Mirando, discloses a plastic foam pump in an air-tight bladder for inflating the bladder and includes a flapper type inlet check valve 23 and duck-bill type outlet check valve 22.

U.S. Pat. No. 3,583,008 to Edwards, discloses a bulb-shaped, self-contained pump 36 connected to each of the inflatable compartments of an air mattress. The bulb relies upon a U-shaped spring and a coil spring 54 to expand the bulb after it has been compressed in each stroke of the pump.

U.S. Pat. No. 4,674,532 to Koyanagi, discloses a check valve for a balloon formed of a plurality of plastic film, including a pipe and at least one valve body formed as a pouch, laterally closed at one end.

U.S. Pat. No. 4,917,646 to Kieves, discloses a self-sealing air valve for a balloon formed by two sheets of plastic. One of the sheets is of substantially greater length than the other to provide a tab 62 for securing the valve in the stem of the balloon. The sheets are fitted together in such a way as to form an offset section 74 or throat.

It is the principal object of this invention to provide a wholly thermoplastic check valve and inflatable bladder combination of simpler, less inexpensive and more compact construction than the valves disclosed in the prior art and can be used for liquids as well as gases while, at the same time, being reliable in operation.

It is another object of this invention to provide a check valve of the above type which, because of its soft and pliable construction, lends itself to ease of co-assembly in various types of inflatable bladder applications.

It is a further object of this invention to provide a combination check valve and fluid pump of very low profile, especially adapted to be used in inflatable body support applications such as, inflatable athletic shoe liners, medical splints, intravenous needle holders for pediatric applications, athletic gloves, brassieres, back support belts and the like where compactness, flexability, comfort, convenience, durability and reliability are important.

It is still a further object of this invention to provide a check valve to prevent very high "spike" pressures from bleeding fluid from one bladder chamber to another chamber.

The above and other objects and advantages of this invention will be more readily apparent from the following description read in conjunction with the accompanying drawings in which:

FIG. 1 is a perspective view of a thermoplastic valved, fluid pump and inflatable bladder combination of the type embodying this invention;

FIG. 2 is a section taken along line 2—2 of FIG. 1;

FIG. 3 is a section taken along line 3—3 of FIG. 1;

FIG. 4 is an exploded perspective view illustrative of the method of fabrication of the pump and bladder combination of FIG. 1;

FIG. 5 is a perspective view illustrating one step in the method of preforming the outlet check valve of the pump;

FIG. 6 is a perspective view which depicts one problem overcome by the method embodying this invention;

FIGS. 7-8 are perspective views which depict the preferred method of fabricating plastic check valves embodying this invention;

FIG. 9 is a plan view showing the check valve of FIG. 8 associated with a fluid bladder, and FIG. 10 is an enlarged view of a portion of FIG. 9.

A check valve embodying this invention is shown generally at 30 in FIGS. 1, 3 and 4 and is illustrated in combination with fluid pump 6, including one fluid chamber 8, which may be a pumping chamber, an inflatable bladder, or second chamber 10, and a push-button type exhaust valve 12. It will be recognized that the check valve 30 may be used for providing one-way gas or liquid, hereinafter referred to as "fluid", flow into any type of inflatable bladder or between separate fluid chambers, especially where it may be important to prevent fluid bleeding from one chamber to another chamber as a result of a fluid pressure spike occurring in the one chamber. Such spike pressures would, for example, likely be encountered in athletic shoe fluid bladder applications where the foot impacts upon the sole chamber of the fluid bladders while, at the same time, much lower pressure would exist in one of the upper chambers of the fluid bladder.

The pump 6 comprises an inner core of reticulated, open-cell elastomeric foam 14 encapsulated between two outer layers of superimposed, thermoplastic sheet material 16 and 18. The two sheets are adapted to be fused, bonded or sealed together about their peripheral edges, as indicated at 20 in FIG. 1, by heat-sealing, or radio-frequency (R.F.) energy technique, to form the inflatable bladder. At the same time, seal 21 also fuses the sheets together about the perimeter of the foam body 14, thereby forming the pumping chamber 8. The pump 6 may be of any suitable configuration, depending upon the application to which the pump will be adapted.

It is essential that the foam 14 consist of an open-cell, reticulated and resiliently flexible elastomeric material, such as a polyurethane foam having an uncompressed thickness of about one-half to one inch and volume of about one-half to one cubic inch. The upper sheet 16, best shown in FIGS. 1 and 4, is provided with two holes 22 and 24. The former serves as an inlet check valve, while the hole 24 serves to receive therethrough the stem portion 25 of the exhaust valve 12. The elastomeric foam body 14 may be cubical, as shown in FIG. 1, or may be of cylindrical configuration with a circular outer periphery and is preferably a reticulated, open-cell polyurethane foam which has 10 to 50 pores per inch and may be of any suitable size and shape, depending upon the application. A 1-inch cube of such foam of 0.5 to 1-inch in thickness, or a cylinder of 1-inch in diameter by 0.5 to 1-inch in thickness, have been found to operate in a highly satisfactory manner. In any event, the open-cell foam is sealed within the pumping chamber of the device, except for hole 22 and the fluid passage provided by a check valve 30 (FIGS. 1, 3 and 4).

The check valve 30 is adapted to extend from without to within the inflatable bladder 10 through the peripheral seal line 21 and, as shown in FIG. 1, may extend from pump chamber 8 into the inflatable chamber 10. The check valve 30 is of the "duck-bill" variety which provides for one-way fluid flow to chamber 10 from the high pressure chamber 8 defined by the foam 14, upper and lower sheets 16 and 18 and the peripheral seals 20 and 21. The valve 30 consists essentially of two superposed layers of heat-sealable plastic film 32 and 34 sealed together along laterally-spaced zones of their side edges, as at 36, so as to define a central channel 38 which serves for the one-way fluid flow from the pumping chamber 8 into the fluid bladder 10. The outer layers 16 and 18 may be thermoplastic sheet material, such as polyurethane or polyvinylchloride which may range in thickness from about 0.005 to 0.050 inch. The inner layers 32 and 34 consist of plastic films in the range of 0.001 to 0.015-inch in thickness, a substantially lesser guage than that of the outer layers 16 and 18. The films 32 and 34 are preferably formed as the same material as the outer layers.

It is essential that the channel 38 remain "open" from the chamber 8 to the chamber 10 through the area of the seal 21 along the perimeter of the foam, despite the fact that the outer surfaces of the plastic films 32 and 34 are simultaneously sealed to the inner surfaces of the upper and lower sheets 16 and 18. This unsealed area or zone is provided by a barrier material or coating 40 disposed between the opposed inner surfaces of the films 32 and 34, as shown in FIGS. 3 and 4. The barrier material 40 is preferably applied to opposed areas on both films and is of sufficient area and thickness to prevent heat or R.F. energy sealing together of the so-coated area of the films 32 and 34 when the sealing of sheets 16 and 18 is being carried out in the assembly process to form the two fluid chambers 8 and 10. Such sealing is prevented even though those areas of the films are disposed in abutting relationship and subjected to sufficient energy so that the outer surfaces of the films will be sealed to the inner surfaces of the bladder. The one-way check valve 30 is biased "open" at one end by the sheets 16 and 18 and by the adjacent edge of foam 14 while the other ends of the films, disposed within the bladder, have an inherent tendency to remain in intimate surface-to-surface contact because of the construction of the valve and texture of the films.

The barrier coating 40 may be applied by conventional printing techniques, such as silk sceening, rotogravure or flexographic process. Preferably, the coating is applied as a composition in a liquid dispersion medium of an organic solvent or water base with a dispersed phase of finely divided microscopic particles, on the order of five (5) microns in diameter, of a polyethylene, a polytetrafluoroethylene (Teflon) or silicone. The barrier material may be applied, as disclosed in my co-pending U.S. patent application, Ser. No. 07/535,655, filed on Jun. 11, 1990 for INFLATABLE BLADDER. It is essential, in any case, that the dispersion medium selected be one that which will condition the surface of the plastic film to cause the microscopic particles to adhere, or be anchored to the surface of the film, to prevent heat-sealing at the coated area of the two plastic flims 32 and 34.

As best shown in FIG. 7, a thermoplastic film 60 used a fabricate the layers of film 32 and 34 which make up the valve 30, has a high gloss, cohesive surface 54 on one side and on the opposite side, a dull or matte surface 55. These surface characteristics of the film are important since they contribute to the one-way flow characteristics of the valve 30. In that connection, the inner surfaces of the films, when placed in contact, will exhibit substantial cohesion, blocking or surface-to-surface affinity which results in the two layers having a marked tendency to stick together. While usually considered a drawback, this property is utilized so that the channel 38 of the valve 30 will remain closed unless pressurized fluid is flowing through the channel from outside the bladder 10. As soon as the incoming fluid ceases to flow, the channel 38 will, because of its internal blocking characteristic, close and be held closed by the fluid pressure within the bladder 10. Conversely, the matte outer surfaces 55 of the films are essentially non-adherent to the inner surfaces 56 of the outer layers 16 and 18 which form the bladder 10 whereby there will be no tendency to compete with the inherent surface-to-surface affinity of the inner glossy surfaces.

It is another preferred feature of the invention that the portion of the sealing area corresponding to the location at which the valve and sheets 16 and 18 of the bladder 10 are fused together, and as illustrated in FIG. 9, is preferably in the form of a chevron or V-shape 58 with the apex of the "V" disposed in a direction toward the pump 8, or the inlet end of the valve. This seal configuration facilitates the opening of channel 38 should there by incidental sticking together of the release layers in the seal area which may occur before the first use of the valve. Because of the V-shape seal 58, pressurized fluid entering the channel 38 will initially contact the apex of the chevron seal 58 and, in effect, start to open-up or peel apart any incidental fusion in the seal area. Once the fluid pressur has opened a narrow channel through the apex of the seal 58, the opening will rapidly expand across the full width of the chevron seal. This action is similar to removing an adhesive strip from another surface by first peeling up a corner of the strip. The valve sealed in this manner will thereby permit easy fluid flow through the channel 38 and into the bladder, despite the fact that prior to first using the valve, there may have been some sticking together at the inlet end thereof.

The outlet check valve 30 embodying this invention, is a subassembly which is preformed in a separate operation by sealing two plastic films disposed in superposed edge-to-edge relation, as shown in FIG. 5. The films 32 and 34 placed on platen 55 are sealed along their side edges 36 by die 53 having a filled non-heating center portion 52 and a pair of edge sealing portions 54. This construction prevents the formation of extrusion beads 56 (FIG. 6), such as would be formed along the side edges of a channel 60 between such films edge-sealed together as a result of using a conventional die and could provide escape channels for the high pressure fluid in the bladder. It is important to avoid the formation of such beads, because otherwise the glossy sides of the two films would not, after each compression stroke of the pump, resume their intimate surface-to-surface contact to block effectively the reverse flow of fluid from the bladder to the pumping chamber. Once closed, fluid pressure in the bladder 10 will act to hold the channel 38 closed.

FIGS. 7 and 8 show the preferred method of manufacturing the valve 30. In FIG. 7, is shown a film 60 adapted for fitting onto a fixture having registration pins (not shown) disposed to extend through holes 61 in the film which is placed with its glossy side 54 facing upwardly. The glossy side of the film 60 may be coated at a plurality of spaced locations with rectangular strips of patches 40' or release material. Each patch has a length l approximately ½ inch which is twice that of the ¼ inch length of the release coating used in each valve 30 and a width w equal to or preferably somewhat greater than the spacing between adjacent seal lines 36 to ensure that the inlet end of the valve will remain open. After coating, the film 60 may be folded along a crease line 62 so that each release patch 40', on one side of fold line 62, will be disposed in registered superposed relationship with each patch on the other side, as depicted in FIG. 8. The two layers of film are then sealed together along a plurality of parallel seal lines 36' using a die of the type shown in FIG. 5, but which has multiple sealing heads. Seal bands 36' are laterally spaced apart a distance approximately equal to or slightly less than the width of the strips 40' to form a fluid flow channel 38 therebetween, as depicted in FIGS. 8 and 9. After sealing, a cutting die may be used to sever the two layers along mutually perpendicular lines. As at 63, the release strips 40' on the superposed film layers are bisected and other cutting edges will cut the films, as at 65, a distance spaced approximately one-inch from the bisected edge. At the same time, the two layers are cut transversely, as at 67, thereby forming a plurality of discrete rectangular valves 30, which for the illustrated embodiment, would be sixteen in number. The die may also include means to cutout registration holes 69 and 70 for use in positioning each of the valves 30 when fabricating the bladder and valve assembly (FIG. 9) and for cutting off the outer edge portions of the films along line 71 (FIG. 7).

It has been found that in the applications where a valve 30 is sealed in a narrow throat portion of a bladder, as depicted in FIG. 9, the bladder, when inflated, will have a tendency to separate the face-to-face, planar contact of the valve films 32 and 34 in the channel area 38. In such applications, leakage problems have been encountered in approximately two percent (2%) of such valves. To overcome this problem, the valve forming die may include means to longitudinally sever or slit the outer end portions of the sealed areas 36 of the valve, as illustrated at 75 in the enlarged section of FIG. 9. It is important that the inner end of the slits 75 be spaced from the inner end of the release material 40, extend to the outlet end of the valve and be located approximately one-half the width of the sealed areas. By this simple slitting step, the outlet end portions of the valves will remain free-floating and not be adversely affected by the inflation of the bladder. The slitting of the sealed areas of valves 30, as at 75, has resulted in such failures being reduced by approximately seventy-five percent (75%).

Accordingly, each valve consists essentially of two layers of plastic film, each coated with a release layers 40 of one-half the length of patches 40' and which extend exactly to the inlet edge of the valve. This precise result is assured because the bisected edges, per se, define the inlet ends of the valves. Thus, when the plastic valve is being sealed to the outer layers 16 and 18 of the bladder, as heretofore described, there will be no sealing of the valve channel 38 beyond the outer end of the release material 40. Moreover, as shown in FIG. 9, the fluid flow channel 38, measured from the inner edge 77 of the release coating 40, should be on the order of ⅜ to ½ inch, but not less than 3/16 inch for effective one-way flow. From edge 77, the channel 38 is preferably of generally uniform cross-section throughout its length. In addition to the channels 38 and the release material 40, each valve is die cut and includes an extension along one side thereof with one or more registration holes 69 and 70 for use in fixing the position of the valve by using registration pins when sealing within a bladder, or bladder and pump combination, as depicted in FIG. 9.

The exhaust valve 12 includes a tubular base 42 with a circular flange 44 of plastic material heat-sealable about the periphery of the hole 24 through sheet 16. The valve also includes reciprocally movable stem 25 and a coil spring 46 disposed about the stem, thereby biasing the valve stem to a normally "closed" position. By pressing the stem 25 downwardly, fluid will be exhausted from the bladder when not in use.

Among the advantages of this combination of a fluid bladder and check valve 30 are its adapability for ease of assembly, as illustrated in FIG. 4. A sheet 18 is first laid on the platen 50 of a heat-sealing die and a foam block 14 and check valve 30 are placed in juxtaposition on the upper surface of the sheet 18. An upper sheet 16 with exhaust valve 12, having been fitted into and sealed to the surrounding edge of the hole 24, is superimposed in edge-to-edge relation over the sheet 18 with the foam block 14 and the check valve 30 interposed therebetween. A heat-sealing die (not shown) of suitable configuration is then lowered to seal together the sheets 16 and 18 about their marginal edges and about the perimeter of the foam block 14 to form the pumping chamber 8 and air bladder 10. As a consequence, the fluid bladder, inlet valve, outlet valve, and exhaust valve are all integrated or united in a single sealing operation, thereby forming on the valved unit of flexible, inexpensive, adaptable and reliable construction.

OPERATION

In operation, it is only necessary for the user to place a finger or thumb over the fluid hole 22 provided in the upper sheet 16 and alternately depress and release the finger pressure on the elastomeric foam a sufficient number of pulsations until the bladder 10 is properly inflated. In this pumping action, the inlet valve is automatically opens and closes in response to the sequential application of the finger over the hole during the compression and expansion of the foam. When opening 22 is uncovered, ambient fluid is drawn through the hole 22 and fills the open cells of the foam as it expands. During the pressure stroke, the fluid is expelled from the foam and flows through the channel 38 of the check valve 30 which closes after each compression stroke. When the thumb is removed from the hole, the fluid once again enters the pumping chamber. Should any spike pressures occur in chamber 10, the check valve 30 would block the flow of fluid into chamber 8. To deflate the bladder, such as in an athletic shoe liner or the like, it is merely necessary to depress the stem of valve 12 and fluid will be released from the bladder when no longer in use.

Having thus described my invention, what is claimed is:

1. Combination of a check valve and inflatable bladder defined by upper and lower sheets of synthetic plastic material having a seal forming one and another fluid chamber with a fluid passage therebetween, the check valve comprises two layers of plastic film of generally the same length which are sealed together at their side edges and to opposed inner surfaces of the sheets in said passage and having a channel throughout the length thereof for permitting the one-way flow of fluid from the one chamber of the bladder into the other chamber thereof, each of said layers being characterized by a matte non-blocking outer surface and a glossy inner surface having a blocking tendency a barrier material disposed between said film to prevent the heat-sealing together of the film layers at the location where the check valve extends through the seal between said two sheets.

2. Combination of a check valve and inflatable bladder, as set forth in claim 1, in which said sheets and film are composed of the same thermoplastic material, said film material is of a thickness in the range of 0.001 to 0.015 inch and said barrier material is applied to at least one of said films as a coating.

3. Combination air pump and inflatable bladder comprising an open-cell, elastomeric foam disposed between an upper and a lower sheet of synthetic plastic material sealed about the periphery thereof and the perimeter of the foam form both a pumping chamber and the infatable fluid bladder, the foam being inherently compressible and expansible to absorb and expel air from cells thereof, an inlet valve into the pumping chamber provided by a hole through one of the plastic sheets opening at generally the central portion of the foam, an outlet check valve extending through the perimeter seal of the foam communicating with the interior of the inflatable bladder, the outlet check valve comprises two layers of plastic film sealed together at their side edges and to opposed inner surfaces of the sheets and having a channel for permitting the one-way flow of air from the pumping chamber into the bladder contiguous thereto, a barrier material disposed between said film to prevent the heat-sealing together of the film layers at the location where the check valve extends through said perimeter seal.

4. A synthetic plastic check valve having an inlet end and outlet end for an inflatable bladder formed by upper and lower sheets of synthetic plastic material fused together by a peripheral seal, the check valve comprising two layers of plastic film sealed together in superposed, edge-to-edge relation to form a fluid flow channel therebetween, the inner surfaces of said layers of film being high gloss, cohesive surfaces, each of said layers being characterized by a matte non-blocking outer surface, said layers of film being of sufficient length to extend through said peripheral seal from without to within said bladder and having their outer surfaces, adjacent the inlet end of said valve, fused to the inner surfaces of said sheets, a release material interposed between said films at the inlet end of said valve and being of sufficient extent to prevent sealing together at that location.

5. A synthetic plastic check valve, as set forth in claim 4, in which the length of the fluid flow channel from the inner edge of said release material is of generally uniform cross-section.

6. A synthetic plastic check valve, as set forth in claim 5, in which the said length of the fluid flow channel from the inner edge of said release material is at least ⅛ inch.

7. A synthetic plastic check valve having an inlet end and outlet end for an inflatable bladder formed by upper and lower sheets of synthetic plastic material fused together by a peripheral seal, the check valve comprising two layers of plastic flim sealed together in superposed, edge-to-edge relation to form a fluid flow channel therebetween, the inner surfaces of said layers of film being high gloss, cohesive surfaces, said layers being of sufficient length to extend through said peripheral seal from without to within said bladder and having their outer surfaces, adjacent the inlet end of the valve, fused to the inner surfaces of said sheets, the portion of said peripheral seal, which traverses the fluid channel of the valve having a generally V-shape with the apex end thereof disposed toward said inlet-end, and a release material interposed between said films at the inlet end of said valve and being of sufficient extent to prevent sealing together at that location.

8. A synthetic plastic check valve having an inlet end and outlet end for an inflatable bladder formed by upper and lower sheets of synthetic plastic material fused together by a peripheral seal, the check valve comprising two layers of plastic film sealed together in superposed, edge-to-edge relation to form a fluid flow channel therebetween, the sealed areas of the superposed plastic films, which define said fluid flow channel, each include a longitudinal slit disposed intermediate the width of the sealed area of the valve and at the outlet end of said valve, the inner surfaces of said layers of film being high gloss, cohesive surfaces, each of said layers being characterized by a matte non-blocking outer surface, said layers of film being of sufficient length to extend through said peripheral seal from without to within said bladder and having their outer surfaces, adjacent the inlet end of the valve, fused to the inner surfaces of said sheets, a release material interposed between said films at the inlet end of said valve and being of sufficient extent to prevent sealing together at that location.

* * * * *